(12) United States Patent
Park

(10) Patent No.: US 9,094,106 B2
(45) Date of Patent: Jul. 28, 2015

(54) PRECODING METHOD AND APPARATUS

(71) Applicant: Electronics and Telecommunications Research Institute, Daejeon (KR)

(72) Inventor: In Sook Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/184,155

(22) Filed: Feb. 19, 2014

(65) Prior Publication Data
US 2014/0241455 A1 Aug. 28, 2014

(30) Foreign Application Priority Data

Feb. 28, 2013 (KR) .................. 10-2013-0022441

(51) Int. Cl.
| | | |
|---|---|---|
| H04B 15/00 | (2006.01) | |
| H04B 1/62 | (2006.01) | |
| H04L 1/00 | (2006.01) | |
| H04L 25/03 | (2006.01) | |

(52) U.S. Cl.
CPC ............... *H04B 1/62* (2013.01); *H04L 1/0041* (2013.01); *H04L 25/03343* (2013.01); *H04L 25/03891* (2013.01)

(58) Field of Classification Search
CPC ... H04L 1/0003; H04L 25/03343; H04L 1/62; H04L 1/0041; H04L 25/03891; H04B 3/32; H04B 7/0417; H04B 7/0456; H04B 7/0621; H04B 7/0626; H04B 7/0632; H04W 52/24
USPC ................. 375/285, 295–296, 316, 340, 346; 455/63.1, 67.13, 69, 114.2; 370/252, 370/329
See application file for complete search history.

(56) References Cited

U.S. PATENT DOCUMENTS

| | | | | |
|---|---|---|---|---|
| 2013/0089046 | A1* | 4/2013 | Lim et al. ...................... | 370/329 |
| 2014/0003264 | A1* | 1/2014 | Shin .............................. | 370/252 |
| 2014/0023033 | A1* | 1/2014 | Chun et al. ................... | 370/329 |
| 2014/0161023 | A1* | 6/2014 | Seo et al. ...................... | 370/315 |

OTHER PUBLICATIONS

V. Sreekanth Annapureddy et al., "Gaussian Interference Networks: Sum Capacity in the Low-Interference Regime and New Outer Bounds on the Capacity Region" IEEE Trans. Information Theory vol. 55/ No. 7, pp. 3032-3050, Jul. 2009.

Steven W. Peters et al., "Cooperative Algorithms for MIMO Interference Channels" IEEE Trans. Vehicular Technology vol. 60/ No. 1, pp. 206-218, Oct. 2010.

* cited by examiner

*Primary Examiner* — Khanh C Tran
(74) *Attorney, Agent, or Firm* — Rabin & Berdo, P.C.

(57) ABSTRACT

A precoding method and apparatus are provided. Each transmission node receives feedback on first information as information regarding a transmission node that transmits an interference signal causing an interference-to-noise ratio (INR) greater than a first reference value from reception nodes, determines a group to which each transmission node belongs on the basis of the first feedback information, and allocates resources to each group. In a detailed manner, each transmission node determines comparison values of INRs, as two or more values, determines a group by using feedback information corresponding thereto, and allocates resources. Each transmission node receives feedback on channel information or precoder information from reception nodes of each group to which each transmission node belongs, and determines a precoder by using the feedback channel information or precoder information.

19 Claims, 13 Drawing Sheets

(a)  (b)

PRECODING METHOD AND APPARATUS

CROSS-REFERENCE TO RELATED APPLICATION

This application claims priority to and the benefit of Korean Patent Application No. 10-2013-0022441 filed in the Korean Intellectual Property Office on Feb. 28, 2013, the entire contents of which are incorporated herein by reference.

BACKGROUND OF THE INVENTION (a) Field of the Invention

The present invention relates to a precoding method and apparatus.

(b) Description of the Related Art

When a plurality of transmission/reception nodes perform communication using the same resource, each transmission node precodes a transmission signal in order to reduce an influence of an interference signal or increase strength thereof, relative to an interference signal. Here, precoding refers to applying a precoder to a transmission signal, and a precoder may be called a precoding matrix, a precoding vector, a beamforming matrix, or a beamforming vector.

In a Gaussian interference channel including a plurality of transmission/reception nodes, it is known that, when each node causes interference or is interfered with, if a ratio of an interference signal strength to noise strength is smaller than a certain value, interference is assumed to be noise in processing signals to achieve the sum of the overall capacity.

In a case that strength of an interference signal is too strong to be disregarded, an algorithm for iteratively calculating a transmission filter and a reception filter and determining a transmission filter having a predetermined amount of calculation lower than a predetermined reference value, as a precoder, has been known.

Such an algorithm iteratively calculates a transmission filter and a reception filter in the process of calculating a precoder, and here, since the number of repetitions is great, an amount of calculation is increased, and since feedback channel information is instantaneous information, an amount of feedback is increased.

SUMMARY OF THE INVENTION

The present invention has been made in an effort to provide a precoding method and apparatus having advantages of increasing resource usage efficiency and reducing an amount of calculation and feedback information.

An exemplary embodiment of the present invention provides a method for precoding a signal at transmission nodes. The precoding method may include: receiving feedback on a first information as information regarding a transmission node that causes an interference-to-noise ratio (INR) greater than a first reference value from a plurality of reception nodes; determining a group to which each transmission node belongs on the basis of the first information; receiving feedback on channel information or precoder information from each reception node corresponding to the each transmission node; determining a precoder by using the channel information or the precoder information; and precoding a transmission signal by using the determined precoder.

The determining of a group may include: selecting a first transmission node from among transmission nodes whose group has not been determined; and determining remaining pairs of transmission and reception nodes, excluding second transmission nodes corresponding to the first information fed back from the first reception node corresponding to the first transmission node, second reception nodes corresponding to the second transmission nodes, and third reception nodes which provided feedback on the first information corresponding to the first transmission node, and transmission nodes corresponding to the third reception nodes, as a group which is the same as that of the first transmission node and the first reception node.

The channel information may be a first matrix obtained by applying an average to a matrix obtained by multiplying a channel coefficient matrix between each transmission node and each reception node and a conjugate transposed matrix of the channel coefficient matrix.

The channel information may be information obtained by quantizing a matrix obtained by applying an average to a matrix obtained by multiplying the channel coefficient matrix between each transmission node and each reception node and the conjugate transposed matrix of the channel coefficient matrix.

The determining of a precoder may include: selecting a number of eigenvectors that is half or less of the number of antennas of each transmission node, from among eigenvectors of the first matrix; and determining a precoding matrix obtained by arranging the selected eigenvectors in the form of column vectors or row vectors.

The precoder information may be a precoding matrix obtained by arranging a number of eigenvectors that is half or less of the number of antennas of the first transmission node, from among a matrix obtained by applying an average to a matrix obtained by multiplying a channel coefficient matrix between each transmission node and each reception node and a conjugate transposed matrix of the channel coefficient matrix, in the form of column vectors or row vectors.

The transmission nodes that belong to the group may be allocated the same radio resources, and the transmission nodes that belong to a group different from the group may be allocated different radio resources.

Another embodiment of the present invention provides a method for precoding a signal at transmission nodes. The precoding method may include: receiving feedback on a first information as information regarding a transmission node that transmits an interference signal causing an interference-to-noise ratio (INR) greater than a first reference value and smaller than a second reference value and a second information as information regarding a transmission node that transmits an interference signal causing an INR greater than the second reference value from a plurality of reception nodes; determining a group to which each transmission node belongs on the basis of the first information and the second information; allocating resources to each group such that all transmission and reception nodes of the same group are allocated the same resources and different groups are allocated different resources; determining a precoder according to the determined groups; and precoding a transmission signal by using the determined precoder.

The determining of each group may include: when a number of pairs of transmission and reception nodes whose groups are not determined is one, determining the pair of transmission and reception nodes, as a group; when a number of pairs of transmission and reception nodes whose groups are not determined is two or more, selecting a first transmission node from among the transmission nodes whose groups are not determined, and determining remaining pairs of transmission and reception nodes, excluding second transmission nodes corresponding to the first information and the second information, among information fed back by a first reception node corresponding to the first transmission node, and excluding third reception nodes which fed back information corresponding to the first transmission node as the first information or the second information, and third transmission nodes corresponding to the third reception nodes, as a preliminary group; when the preliminary group is not an empty set, determining pairs of transmission and reception nodes belonging to the preliminary group and the first transmission node and the first reception node, as a group; and when the preliminary group is an empty set, determining remaining pairs of transmission and reception nodes, excluding fourth transmission nodes corresponding to the second information fed back by the first reception node and fourth reception nodes corresponding to the fourth transmission nodes and excluding fifth reception nodes which fed back the information corresponding to the first transmission node, as the second information, and fifth transmission nodes corresponding to the fifth reception nodes, among the transmission and reception nodes whose groups are not determined, as a first preliminary group, and determining the transmission and reception nodes belonging to the first preliminary group and the first transmission node and the first reception node, as a group.

The precoding method may further include, when an INR caused by each transmission node that belongs to each group with respect to each reception node is smaller than the first reference value or greater than the second reference value, receiving feedback on channel information or precoder information from each reception node corresponding to each transmission node, wherein in the determining of a precoder, a precoder is determined by using the channel information or the precoder information.

The channel information may be a first matrix obtained by applying an average to a matrix obtained by multiplying a channel coefficient matrix between each transmission node and each reception node corresponding to each transmission node and a conjugate transposed matrix of the channel coefficient matrix.

The precoder information may be a precoding matrix obtained by aligning eigenvectors of a matrix, obtained by applying an average to a matrix obtained by multiplying a channel coefficient matrix between each transmission node and each reception node corresponding to each transmission node and a conjugate transposed matrix of the channel coefficient matrix, in sequence, starting from an eigenvector having the highest eigenvalue, selecting eigenvectors having a higher eigenvalue by half or less of the number of antennas of each transmission node, and arranging the same.

The precoding method may further include, when an INR caused by each transmission node that belongs to each group with respect to each reception node is greater than or equal to the first reference value or smaller than or equal to the second reference value, receiving, by each transmission node that belongs to the group, feedback on channel information between each reception node and all transmission nodes of the group from each reception node that belongs to the group, wherein in the determining of a precoder, a precoder is calculated through an iterative process such that a predetermined reference value becomes equal to or lower than a predetermined value by using the feedback channel information, and a precoder at an immediately previous time is substituted for an initial input value of the iterative process.

The predetermined reference value may be a value of strength of a reception interference signal or a value obtained by linearly combining strength of a reception signal and strength of the reception interference signal.

Yet another embodiment of the present invention provides a precoding apparatus. The precoding apparatus may include: a feedback reception unit configured to receive feedback on a first information as information regarding a transmission node that transmits an interference signal causing an interference-to-noise ratio (INR) greater than a first reference value or a second information as information regarding a transmission node that transmits an interference signal causing an INR greater than or equal to the first reference value or smaller than or equal to a second reference value, and a third information as information regarding a transmission node that transmits an interference signal causing an INR greater than the second reference value; a grouping unit configured to determine a group to which each transmission node belongs according to the first information or determining a group to which each transmission node belongs according to the second information and the third information; a resource allocation unit configured to allocate resources according to the determined group; a precoder determining unit configured to determine a precoder according to the determined group; and a precoding unit configured to precode a transmission signal by using the determined precoder.

When the feedback reception unit receives the first information, the feedback reception unit may receive feedback on channel information or precoding information from each reception node corresponding to each transmission node, and the precoder determining unit may determine the precoder by using the channel information or the precoding information.

When the feedback reception unit receives the first information, the grouping unit selects a first reception node which has not been grouped, and determines remaining pairs of transmission and reception nodes, excluding second transmission nodes corresponding to the first information fed back from the first reception node, second reception nodes corresponding to the second transmission nodes, third reception nodes which had fed back the first information corresponding to the first transmission node, and transmission nodes corresponding to the third reception nodes, as a group which is the same as that of the first transmission node and the first reception node.

When the feedback reception unit receives the second information and the third information, if a number of pairs of transmission and reception nodes whose groups are not determined is one, the grouping unit determines the single pair of transmission and reception nodes, as a group, and if a number of pairs of transmission and reception nodes whose groups are not determined is two or more, the grouping unit selects a first transmission node from among the transmission nodes whose groups are not determined, determines remaining pairs of transmission and reception nodes, excluding second transmission nodes corresponding to the first information and the second information among information fed back by a first reception node corresponding to the first transmission node, and second reception nodes corresponding to the second transmission nodes, and excluding third reception nodes which had fed back information corresponding to the first transmission node, as the first information or the second information, and third transmission nodes corresponding to the third reception nodes, as a preliminary group; and when the preliminary group is not an empty set, the grouping unit determines pairs of transmission and reception nodes that belong to the preliminary group and the first transmission node and the first reception node, as a group, and when the preliminary group is an empty set, the grouping unit determines remaining pairs of transmission and reception nodes, excluding fourth transmission nodes corresponding to the second information fed back by the first reception node and fourth reception nodes corresponding to the fourth transmission nodes and excluding fifth reception nodes which had fed back information corresponding to the first transmission node, as the second information, and fifth transmission nodes corresponding to the fifth reception nodes, among the transmission and reception nodes whose groups are not determined, as a first preliminary group, and determines the transmission and reception nodes that belong to the first preliminary group and the first transmission node and the first reception node, as a group.

The resource allocation unit allocates resources to each group such that all transmission and reception nodes of the same group are allocated the same resources, and different groups are allocated different resources.

According to embodiments of the present invention, since pairs of transmission and reception nodes are divided into groups and different resources are allocated to each group, an influence of an interference signal can be reduced. Also, an amount of feedback information and the number of times of feedback required for calculating precoders can be reduced. Thus, the precoding method according to embodiments of the present invention can be easily applied to a network environment in which channels are varied over time, and a data transfer rate can be increased.

DETAILED DESCRIPTION OF THE EMBODIMENTS

Figure 1:
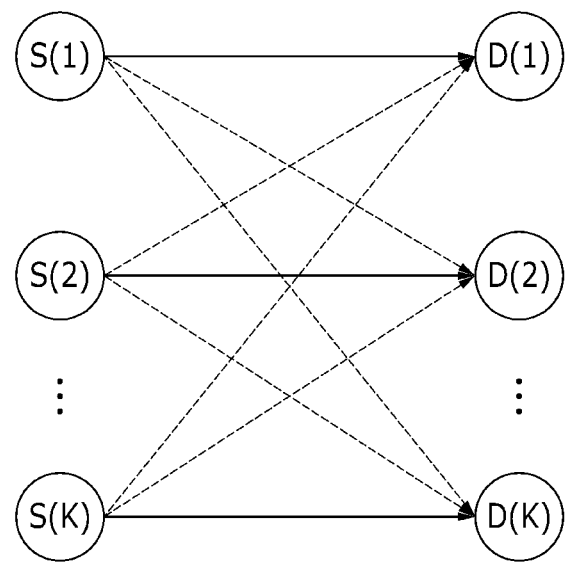
FIG. 1 is a view illustrating a wireless communication system according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a terminal may refer to a mobile terminal (MT), a mobile station (MS), an advanced mobile station (AMS), a high reliability mobile station (HR-MS), a subscriber station (SS), a portable subscriber station (PSS), an access terminal (AT), user equipment (UE), or the like, and may include an entirety or a portion of functions of a terminal, an MT, an AMS, an HR-MS, an SS, a PSS, an AT, a UE, or the like.

Also, a base station (BS) may refer to an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, an HR-RS serving as a base station, and the like, and may include the entirety or a portion of functions of an ABS, a node B, an eNodeB, an AP, an RAS, a BTS, an MMR-BS, an RS, an HR-RS, or the like.

FIG. 1 is a view illustrating a wireless communication system according to an embodiment of the present invention.

In FIG. 1, a plurality of nodes transmit and receive signals using the same resource. Here, in the following description, it is assumed that a k-th node that transmits a signal is a transmission node S(k) and a i-th node that receives a signal is a reception node D(i). Each transmission node or reception node may be a base station (BS) or a terminal (i.e., user equipment (UE) or a mobile station (MS)) and may have at least one antenna as an object having a device for transmitting or receiving a signal.

It is assumed that a K number of transmission nodes and a K number of reception nodes exist and that transmission signals transmitted from all the transmission nodes [S(k), k≠i], excluding the i-th transmission node [S(i)], act as interference signals.

Meanwhile, in the following description, a channel coefficient matrix acting on a signal transmitted from the transmission node [S(k)] to the reception node [D(i)] will be indicated as $H_{ik}$, and a precoder applied when the transmission node [S(k)] transmits a signal will be indicated as $V_k$. A conjugate transposed matrix of a matrix A will be indicated as A*, and E[A] is a matrix obtained by applying an average to each element of A.

The precoding method according to an embodiment of the present invention differs according to an interference-to-noise ratio (INR) of a reception signal measured by each reception node at a predetermined time. Hereinafter, the precoding method according to an embodiment of the present invention will be described in detail.

First, a precoding method according to a first embodiment of the present invention will be described in detail with reference to FIGS. 2 through 6.

Figure 2:
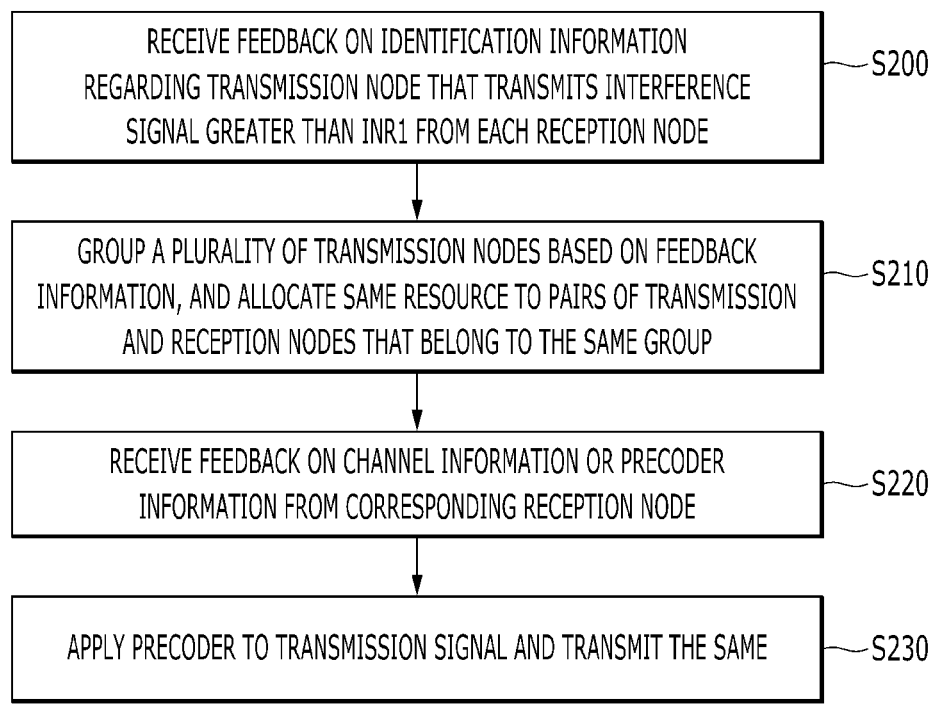
FIG. 2 is a flowchart illustrating a precoding method according to a first embodiment of the present invention.

FIG. 2 is a flowchart illustrating a precoding method according to a first embodiment of the present invention.

The precoding method according to the first embodiment of the present invention is applied by comparing INRs of reception signals received by respective reception nodes node [D(i)] with a predetermined first reference value INR0. Here, an INR of a reception signal is a value obtained by dividing the sum of strengths of interference signals measured at a predetermined time by strength of noise.

A plurality of transmission nodes [S(1)~S(K)] receive feedback on identification information regarding a transmission node transmitting an interference signal greater than a predetermined second reference value INR1 among the plurality of transmission nodes from the respective reception nodes [D(i)] (S200). Here, the identification information may be a node number or a temporary identifier. The reception nodes provide feedback in a broadcast or multicast manner. In setting the second reference value INR1, for example, in a case in which the number of transmission nodes that transmit an interference signal is "a", the second reference value INR1 may be set to INR0/a.

Figure 3:
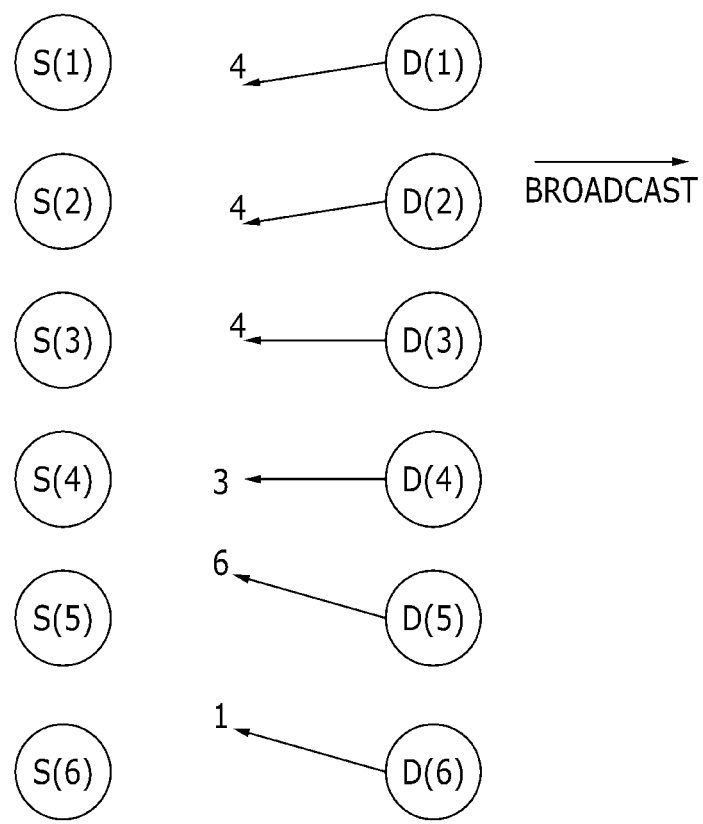
FIG. 3 is a view illustrating an example of transmitting identification information of a transmission node from a reception node to the transmission node in the first embodiment of the present invention.

FIG. 3 is a view illustrating an example of transmitting identification information of a transmission node from a reception node to the transmission node in the first embodiment of the present invention. In FIG. 3, it is assumed that the number of pairs of transmission and reception nodes is 6 (K=6), each node has four antennas, and the first reference value INR0 is 58 dB.

Each reception node [D(i)] measures an INR of a reception signal, and when it is smaller than 58 dB, each reception node broadcasts identification information "0", while if the INR of a reception signal received by each reception node [D(i)] is greater than 58 dB, each reception node broadcasts an identification number of a transmission node which transmits an interference signal greater than the second reference value 11.6 dB (INR0/a=58 dB/5).

Referring to FIG. 3, a reception node [D(i)] determines that a transmission node transmits an interference signal greater than 11.6 dB, and broadcasts "4" as a pertinent identification number. Reception nodes [D(2), D(3)] also broadcast the identification number "4", and a reception node [D(4)] broadcasts an identification number "3". A reception node [D(5)] transmits an identification number "6", and a reception node [D(6)] transmits an identification number "1".

In a following step, referring to FIG. 2, the respective transmission nodes [S(k)] are grouped on the basis of feedback information, and pairs of transmission and reception nodes belonging to the same group are allocated the same resource (S210).

Here, a grouping process is performed as follows. In the wireless communication system as illustrated in FIG. 1, first, grouping starts on the basis of a pair of transmission and reception nodes [S(1), D(1)]. Remaining pairs of transmission and reception nodes, excluding transmission nodes (i.e., identification numbers) fed back by the reception node [D(1)] and reception nodes corresponding to the transmission nodes, and reception nodes which fed back the transmission node [S(1)] and transmission nodes corresponding to the reception nodes, are determined as a first group $G_1$, like the pair of transmission and reception nodes [S(1), D(1)]. Pairs of transmission and reception nodes not belonging to the first group $G_1$ are grouped in the same manner, and the grouping process is performed until all the pairs of transmission and reception nodes belong to any one group. Here, for the description purpose, the pair of transmission and reception nodes [S(1), D(1)] are first grouped, but any other pair of transmission and reception odes may be first grouped.

Each transmission node [S(i)] knows all the identification information broadcast by each reception node [D(i)], so each transmission node [S(i)] may perform such a grouping process by itself.

Figure 4:
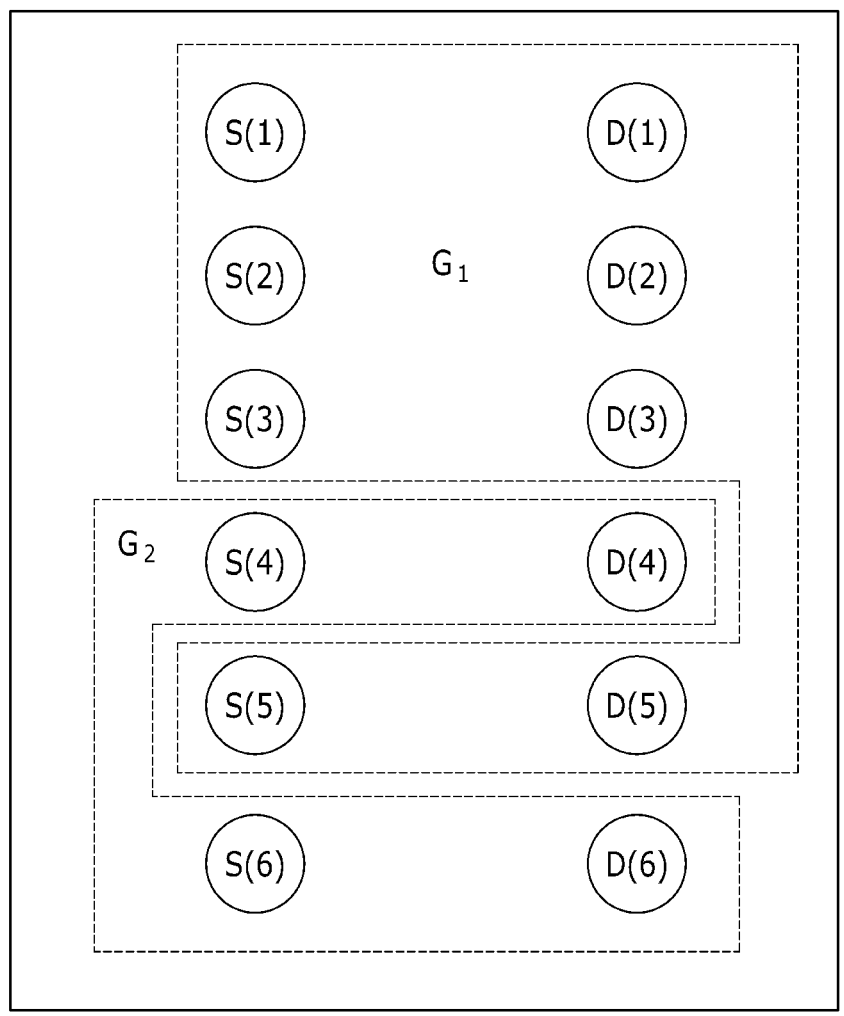
FIG. 4 is a view illustrating results obtained by applying a grouping process in the situation of FIG. 3.

FIG. 4 is a view illustrating results obtained by applying a grouping process in the situation of FIG. 3.

In FIG. 3, the reception node [D(1)] transmits the identification node "4" of the transmission node [S(4)] as feedback information, and the reception node [D(6)] transmits the identification number "1" of the transmission node [D(1)] as feedback information. Thus, when the foregoing reference is applied, pairs of transmission and reception nodes, excluding the pair of transmission and reception nodes [S(4), D(4)] and the pair of transmission and reception nodes [S(6), D(6)], belong to the group of the pair of transmission and reception nodes [S(1), D(1)]. That is, the first group $G_1$ includes the pairs of transmission and reception nodes [S(1), D(1)], [S(2), D(2)], [S(3), D(3)], and [S(5), D(5)]. Next, when the foregoing reference is applied to the pair of transmission and reception nodes [S(4), D(4)], the second group $G_2$ include pairs of transmission and reception nodes {[S(4), D(4)] and [S(6), D(6)]}.

Figure 5:
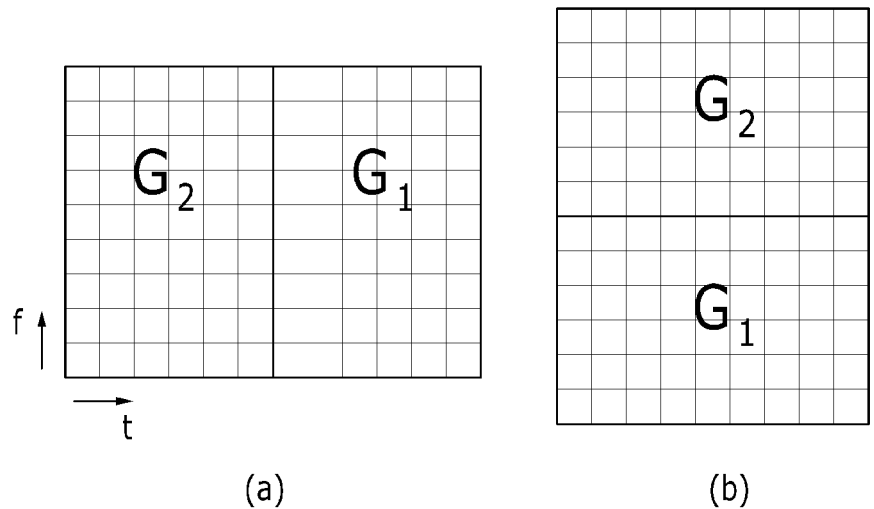
FIG. 5 is a view illustrating an example of allocating different resources to a first group $G_1$ and a second group $G_2$.

Meanwhile, different resources are allocated to the first group $G_1$ and the second group $G_2$ grouped thusly. FIG. 5 is a view illustrating an example of allocating different resources to the first group $G_1$ and the second group $G_2$. As illustrated in (a) of FIG. 5, the first group $G_1$ and the second group $G_2$ may be allocated different time resources, or as illustrated in (b) of FIG. 5, the first group $G_1$ and the second group $G_2$ may be allocated different frequency resources.

In a next step, referring to FIG. 2, each transmission node [S(i)] receives feedback on channel information or precoder information from each reception node [D(i)] (here, i=1, ... K) corresponding thereto (S220).

Figure 6:
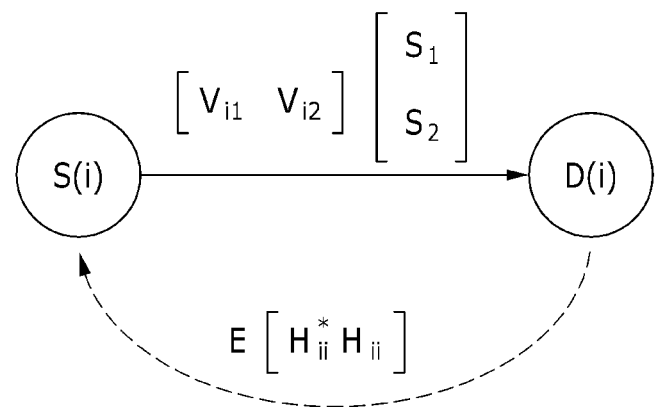
FIG. 6 is a view illustrating a method in which channel information is fed back from a reception node [D(i)] and a transmission node [S(i)] precodes it in the first embodiment of the present invention.

FIG. 6 is a view illustrating a method in which channel information is fed back from a reception node [D(i)] and a transmission node [S(i)] precodes it in the first embodiment of the present invention.

As illustrated in FIG. 6, the transmission node receives feedback on an average $E[(H_{ii})*(H_{ii})]$ of $(H_{ii})*(H_{ii})$ or quantized information of $E[(H_{ii})*(H_{ii})]$ from the reception node [D(i)]. Instead of the $E[(H_{ii})*(H_{ii})]$ information, the reception node [D(i)] may feed back a precoding matrix having a number of eigenvectors equal to half (½) of the number of antennas of the transmission node [S(i)] according to order, starting from an eigenvector having the greatest eigenvalue, among $E[(H_{ii})*(H_{ii})]$ eigenvectors, as column vectors, or may select a code closest to the precoding matrix and feed back an index thereof.

Here, the feedback may be provided in a multicast or unicast manner. In case of the unicast scheme in which transmission is simultaneous, reception nodes of the same group are divided into subgroups, and channel information may be fed back by using different resources for each subgroup.

In a final step, referring to FIG. 2, each transmission node [S(i)] applies a precoder to a transmission signal and transmits the same (S230). As described above, when the transmission node [S(i)] receives feedback on $E[(H_{ii})*(H_{ii})]$ or quantized information of $E[(H_{ii})*(H_{ii})]$ as channel information from the reception node [D(i)], the transmission node [S(i)] selects a number of eigenvectors equal to half or less of the number of transmission antennas, starting from an eigenvector having the greatest eigenvalue, among the eigenvectors of $E[(H_{ii})*(H_{ii})]$, and obtains a precoding matrix (i.e., a precoder) by arranging the selected eigenvectors (arranging the eigenvectors in a column vector manner or in a row vector manner). The transmission node [S(i)] applies such a precoding matrix (i.e., the precoder) to a transmission signal and transmits the same. In FIG. 6, it is assumed that the number of antennas is 4. Thus, the transmission node [S(i)] selects two eigenvectors $V_{i1}$ and $V_{i2}$ according to order, starting from an eigenvector having the greatest eigenvalue, among the eigenvectors of $E[(H_{ii})*(H_{ii})]$, and determines $[V_{i1}, V_{i2}]$ as a precoding matrix of a transmission signal. The transmission node [S(i)] multiplies a transmission signal vector by the precoding matrix $[V_{i1}, V_{i2}]$ to perform precoding.

Meanwhile, there may be a case in which grouping is required to be performed more elaborately, in comparison with the first embodiment of the present invention. This will be described in detail with reference to FIGS. 7 through 11, hereinafter.

Figure 7:
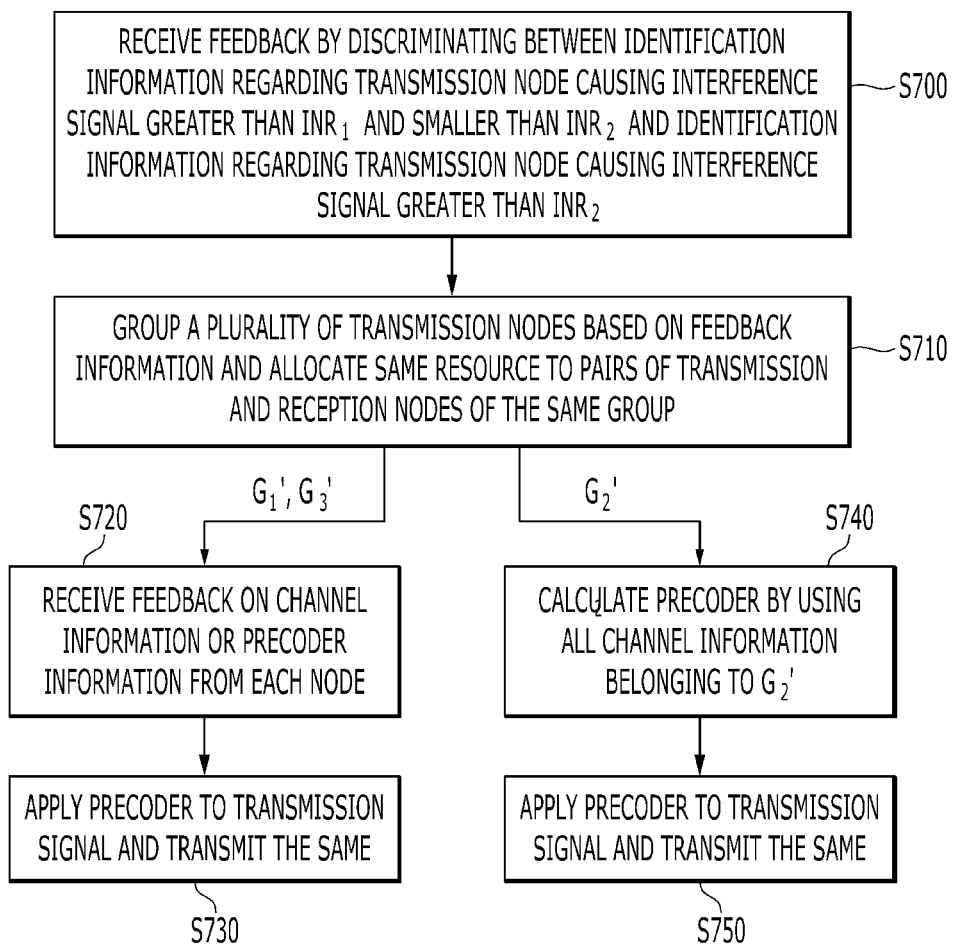
FIG. 7 is a flowchart illustrating a precoding method according to a second embodiment of the present invention.

FIG. 7 is a flowchart illustrating a precoding method according to a second embodiment of the present invention.

In the second embodiment of the present invention, the second reference value INR1 and a third reference value INR2 are applied as reference values. The third reference value INR2 may be set to a value much greater than INR0/k (i.e., INR2>>INR0/k).

The plurality of transmission nodes [S(1)~S(K)] receive feedback on identification information regarding a transmission node causing an interference signal greater than the second reference value INR1 and smaller than the third reference value INR2 from each reception node [D(i)] (S700). The plurality of transmission nodes [S(1)~S(K)] also receive feedback on a transmission node causing an interference signal greater than the third reference value INR2 from each reception node [D(i)] (S700). Here, the identification information may be a node number or a temporary identifier. Each reception node may provide feedback to each transmission node in a broadcast or multicast manner.

Figure 8:
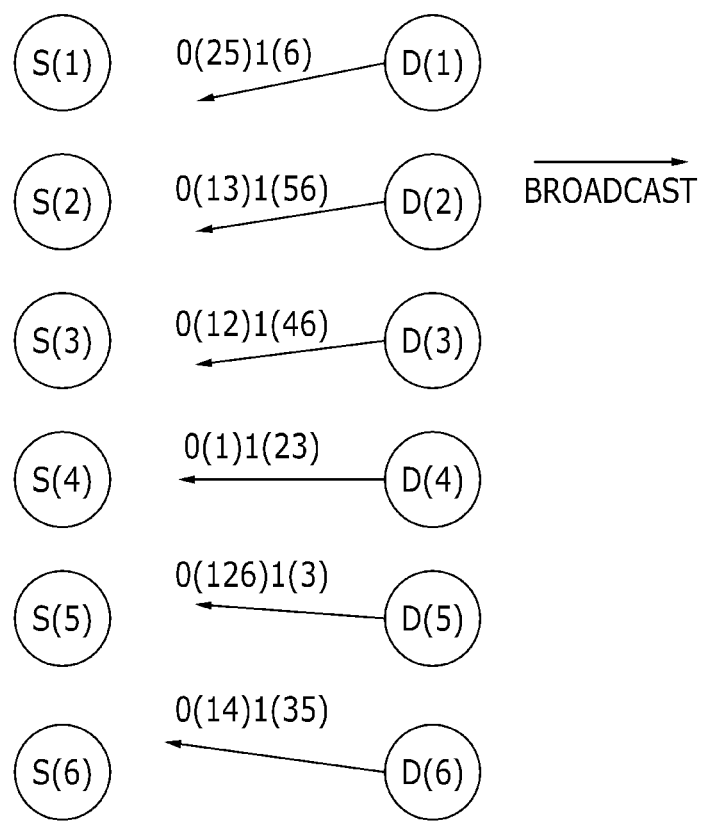
FIG. 8 is a view illustrating an example of transmitting identification information of a transmission node from a reception node to the transmission node in the second embodiment of the present invention.

FIG. 8 is a view illustrating an example of transmitting identification information of a transmission node from a reception node to the transmission node in the second embodiment of the present invention. In FIG. 8, it is assumed that K=6, each node has four antennas, INR0=58 dB, INR1=11.6 dB, and INR2=35 dB.

In FIG. 8, it is illustrated that, when an identification number of a transmission node causing an interference signal greater than the second reference value INR1 and smaller than the third reference value INR2 is x, it is fed back in the form of 0x, and when an identification number of a transmission node causing an interference signal greater than the third reference value INR2 is x, it is fed back in the form of 1x. That is, since transmission nodes causing an interference signal greater than the second reference value INR1 and smaller than the third reference value INR2 are [S(2), S(5)], the reception node [D(1)] broadcasts "0(25)" as identification information. Also, since a transmission node causing an interference signal greater than the third reference value INR2 is the transmission node [S(6)], the reception node [D(1)] broadcasts "1(6)" as identification information.

In a next step, referring to FIG. 7, respective transmission nodes [S(k)] are grouped on the basis of feedback information, and pairs of transmission and reception nodes belonging to the same group are allocated the same resource (S710).

Here, the following reference is applied in the grouping process. In a first grouping process, a group including pairs of transmission and reception nodes, whose strength of an interference signal affecting a different reception node based on the second reference value INR1 is smaller than the second reference value INR1, is set to a first group $G_1'$. In the first grouping process, the group may be set to have as large as possible a size in consideration of efficiency of resource use. The other remaining nodes, which are not set to the first group $G_1'$ in the first grouping process, are grouped in a second grouping process. In the second grouping process, a group including pairs of transmission and reception nodes, whose strength of an interference signal affecting a different reception node is greater than the second reference value INR1 and smaller than the third reference value INR2, is set to a second group $G_2'$. The nodes of the second group $G_2'$ have strength of interference signals therebetween that is greater than the second reference value INR1 or smaller than the third reference value INR2. After the second grouping process is performed, when a pair of transmission and reception nodes exist, this pair of transmission and reception nodes is set to a third group $G_3'$. The pair of transmission and reception nodes belonging to the third group $G_3'$ is a pair of nodes significantly causing an interference signal with respect to the other nodes.

The grouping process in step S710 may be applied to FIG. 8 as follows. The reception node [D(4)] and the reception node [D(5)] have not transmitted an identification number with respect to the transmission nodes (S(4), S(5)), respectively. This means that strengths of interference signals of the pair of transmission and reception nodes [S(4), D(4)] and the pair of transmission and reception nodes [S(5), D(5)] affecting mutually different nodes are smaller than the second reference value INR1. Thus, the first group $G_1'$ includes pairs of transmission and reception nodes [S(4), D(4)] and [S(5), D(5)]. Also strengths of interference signals of the pairs of transmission and reception nodes [S(1), D(1)], [S(2), D(2)], and [S(3), D(3)] therebetween are greater than the second reference value INR1 or smaller than the third reference value INR2, so the pairs of transmission and reception nodes [S(1), D(1)], [S(2), D(2)], and [S(3), D(3)] are set to the second group $G_2'$. The remaining pair of transmission and reception nodes [S(6)D(6)] becomes the third group $G_3'$.

Figure 9:
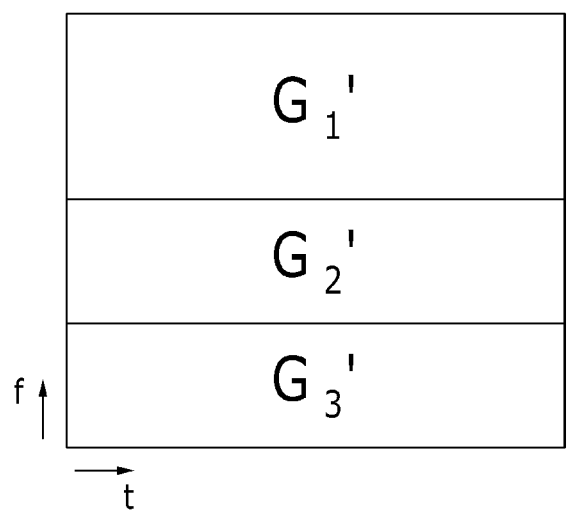
FIG. 9 is a view illustrating an example of allocating different resources to first to third groups $G_1'$, $G_2'$, and $G_3'$.

Different resources are allocated to the first group $G_1'$, the second $G_2'$, and the third group $G_3'$. FIG. 9 is a view illustrating an example of allocating different resources to the first to third groups $G_1'$, $G_2'$, and $G_3'$. Referring to FIG. 9, the first group $G_1'$ to the third group $G_3'$ may be allocated different frequency resources. In FIG. 9, it is illustrated that different frequency resources are allocated, and in this case, different time resources may be allocated.

Meanwhile, as illustrated in FIG. 7, in the second embodiment of the present invention, a method for determining a precoder with respect to the first group $G_1'$ and the third group $G_3'$ and a method for determining a precoder with respect to the second group $G_2'$ are different.

Figure 10:
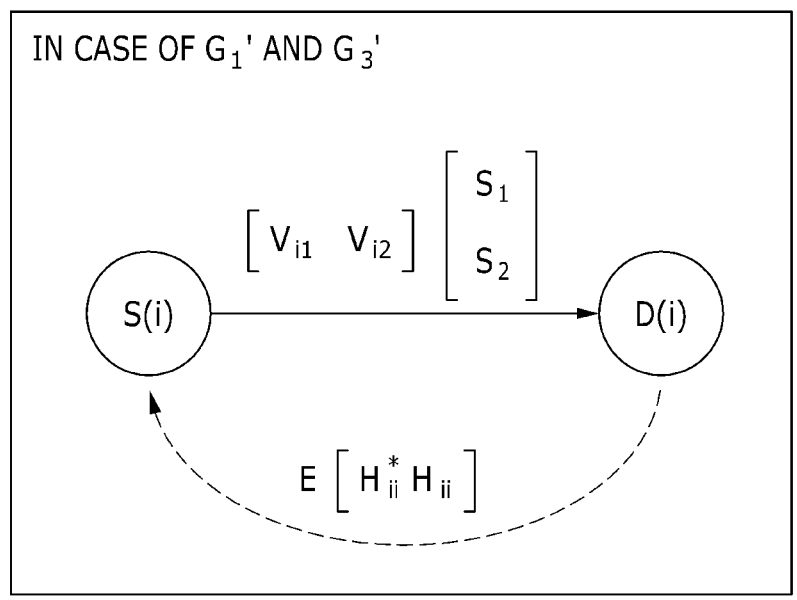
FIG. 10 is a view illustrating a method in which channel information is fed back from a reception node [D(i)] that belongs to the first group $G_1'$ and the third group $G_3'$, and a transmission node [S(i)] precodes it.

The method for determining a precoder with respect to the first group $G_1'$ and the third group $G_3'$ is the same as that of the first embodiment of the present invention. FIG. 10 is a view illustrating a method in which channel information is fed back from the reception node [D(i)] that belongs to the first group $G_1'$ and the third group $G_3'$, and a transmission node [S(i)] precodes it. The method illustrated in FIG. 10 is the same as the method of FIG. 6. That is, step S720 of FIG. 7 is the same as step S220 of FIG. 3, and step S730 of FIG. 7 is the same as step S230 of FIG. 3. Thus, a detailed description of step S720 and step S730 will be omitted.

Meanwhile, as illustrated in FIG. 7, steps S740 and S750 are applied to the second group $G_2'$.

Figure 11:
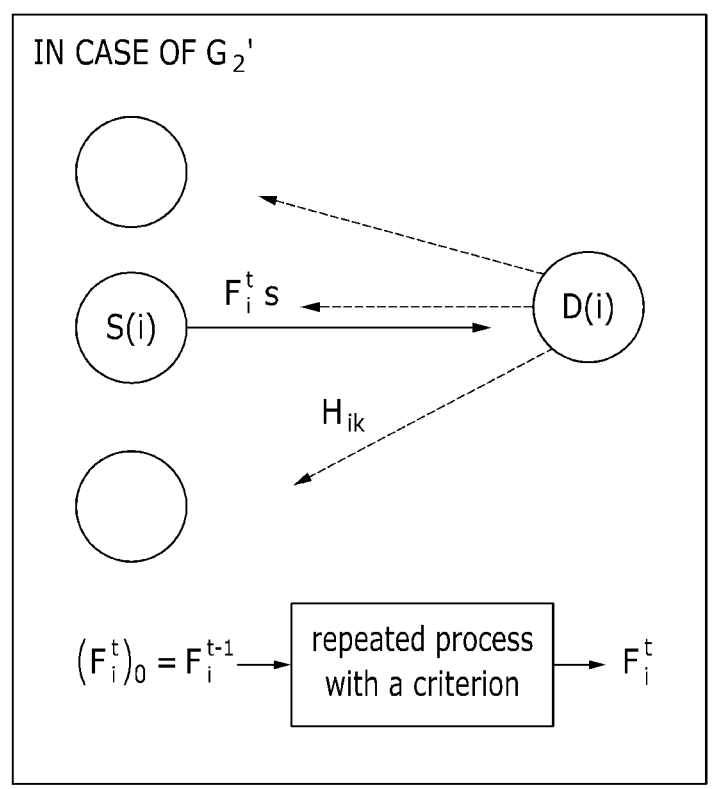
FIG. 11 is a view illustrating a method in which channel information is fed back from a reception node [D(i)] that belongs to the second group $G_2'$ and a transmission node [S(i)] precodes it.

In step S740, the transmission nodes of the second group $G_2'$ calculate a precoder by using all channel information that belongs to the second group $G_2'$ (S740). FIG. 11 is a view illustrating a method in which channel information is fed back from a reception node [D(i)] that belongs to the second group $G_2'$, and a transmission node [S(i)] precodes it.

As illustrated in FIG. 11, each reception node [D(i)] that belongs to the second group $G_2'$ feeds back channel information $H_{ik}$ regarding all the transmission nodes that belong to the second group $G_2'$, as channel information. As described above, when the second group $G_2'$ is set to include the pairs of transmission and reception nodes [S(1), D(1)], [S(2), D(2)], and [S(3), D(3)], in $H_{ik}$, i=1, 2, and 3 and k=1, 2, and 3. That is, with respect to i=1, 2, and 3, the reception node [D(i)] feeds back information regarding $H_{i1}$, $H_{i2}$, and $H_{i3}$.

Each transmission node [S(i)] iteratively calculates precoders by using all the received feedback information, and sets a precoder allowing a predetermined reference value to become a predetermined value (α) as a final precoder. Here, the predetermined reference value may be a strength value of a reception interference signal or a value obtained by linearly combining strength of the reception signal and that of the reception interference signal.

In detail, as illustrated in FIG. 11, each transmission node [S(i)] calculates an initial precoder (($F_i^t$)$_o$) by using all received feedback information, and obtains a reception filter that minimizes the predetermined reference value by using the calculated initial precoder (($F_i^t$)$_o$). Each transmission node [S(i)] calculates a new precoder (($F_i^t$)$_1$) that minimizes the predetermined reference value, and obtains a reception filter that minimize the predetermined reference value by using the precoder (($F_i^t$)$_1$). Each transmission node [S(i)] iteratively performs the process and sets a precoder, by which the predetermined reference value is smaller than the predetermined value (α), as a final precoder (($F_i^t$). Here, t indicates a point in time at which the precoder is applied. In order to increase a convergence speed of the iterative process and reduce the number of repetitions, the initial precoder is placed as a precoder at a previous point in time, like ($F_i^t$)$_o$=$F_i^{t-1}$, and the iterative process is performed.

In the final step S750, the transmission node [S(i)] applies the obtained final precoder (Fit=f) to the transmission signal and transmits the same (S750). That is, as illustrated in FIG. 11, the transmission node [S(i)] multiplies a transmission signal vector by the right side of the final precoder ($F_i^t$) and transmits the same.

Meanwhile, the reception nodes that belong to the second group G$_2$' feed back even channel information of an interference link, so they feed back a larger amount of channel information that that of the reception nodes that belong to the first group G$_1$' and the third group G$_3$'. Also, since the reception nodes that belong to the second group G$_2$' feed back channel information by a shorter period, a dedicated channel for feeding back the channel information may be allocated to the nodes of the second group G$_2$'. An allocated amount of dedicated resources for feeding back channel information may be determined according to variation velocity of channel, the number of nodes that belong to the second group G$_2$', and the number of antennas that belong to the second group G$_2$'.

In the precoding method applied to the second group G$_2$' as described above, although channels are changed over time, if a difference between time intervals is small, channel variance is relatively small. Thus, although the calculations are iteratively performed, a convergence speed can be increased.

Figure 12:
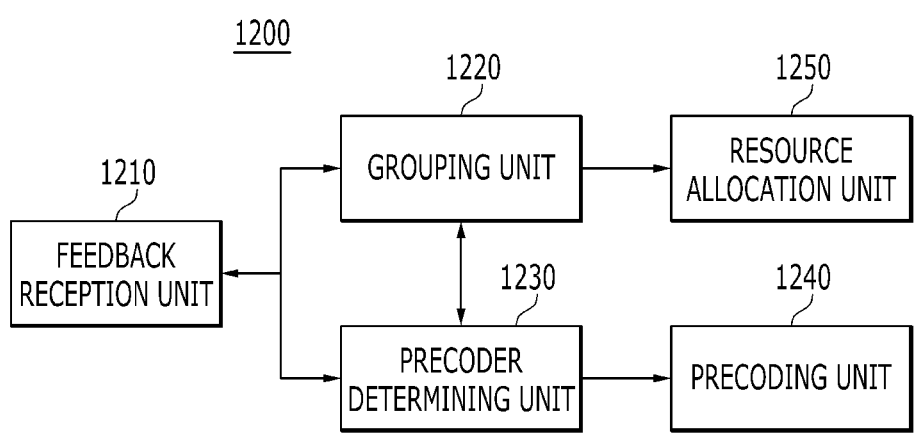
FIG. 12 is a view illustrating a precoding apparatus of a node according to the first embodiment of the present invention.

FIG. 12 is a view illustrating a precoding apparatus of a node according to the first embodiment of the present invention.

Referring to FIG. 12, a precoding apparatus 1200 according to the first embodiment of the present invention includes a feedback reception unit 1210, a grouping unit 1220, a precoder determining unit 1230, a precoding unit 1240, and a resource allocation unit 1250. The precoding apparatus 1200 may be included in a transmission or reception node or may be a transmission or reception node itself, and may be an apparatus for implementing the precoding method according to the first embodiment of the present invention as described above with reference to FIG. 2.

The feedback reception unit 1210 receives feedback on identification information regarding a transmission node that transmits an interference signal greater than the predetermined second reference value INR1 among a plurality of transmission nodes from each reception node.

The grouping unit 1220 sets a group to which the grouping unit 1220 belongs by using the identification information fed back through the feedback reception unit 1210. That is, the grouping unit 1220 performs step S210 of FIG. 2 as described above.

The feedback reception unit 1210 receives feedback on channel information or precoder information from a corresponding reception node. That is, the feedback reception unit 1210 performs step S220 of FIG. 2 as described above.

Meanwhile, the precoder determining unit 1230 determines a precoder by using the channel information or the precoder information fed back through the feedback reception unit 1210.

The resource allocation unit 1250 is allocated resources corresponding to the group set by the grouping unit 1220. That is, the resource allocation unit 1250 allocates resources to each group, and here, all transmission and reception nodes of the same group are allocated the same resource, and different groups are allocated different resources.

The precoding unit 1240 precodes a signal to be transmitted by using the precoder determined by the precoder determining unit 1230.

Figure 13:
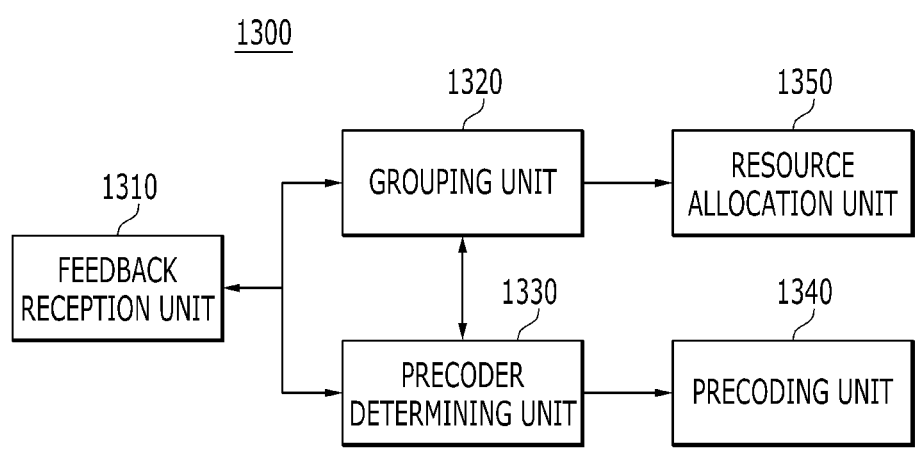
FIG. 13 is a view illustrating a precoding apparatus of a node according to the second embodiment of the present invention.

FIG. 13 is a view illustrating a precoding apparatus of a node according to the second embodiment of the present invention.

Referring to FIG. 13, a precoding apparatus 1300 according to the second embodiment of the present invention includes a feedback reception unit 1310, a grouping unit 1320, a precoder determining unit 1330, a precoding unit 1340, and a resource allocation unit 1350. The precoding apparatus 1300 may be included in a transmission or reception node or may be a transmission or reception node itself, and may be an apparatus for implementing the precoding method according to the second embodiment of the present invention described above with reference to FIG. 7.

The feedback reception unit 1310 receives feedback on identification information regarding a transmission node that causes an interference signal greater than the second reference value INR1 and smaller than the third reference value INR2, and identification information regarding a transmission node that causes an interference signal greater than the third reference value INR2 from each reception node.

The grouping unit 1320 sets a group to which it belongs by using the identification information fed back through the feedback reception unit 1310. That is, the grouping unit 1320 performs step S710 of FIG. 7 as described above.

When the group to which it belongs is a first group G$_1$' or a third group G$_3$', the feedback reception unit 1310 receives feedback on channel information or precoder information from a corresponding reception node. That is, the feedback reception unit 1210 performs step S720 of FIG. 7 as described above. In this case, the precoder determining unit 1330 determines a precoder by using the channel information or the precoder information fed back through the feedback reception unit 1310, and the precoding unit 1340 precodes a signal to be transmitted by using the precoder determined by the precoder determining unit 1330.

Meanwhile, when it belongs to the second group G$_2$', the feedback reception unit 1310 receives feedback on all channel information that belongs to the second group G$_2$'. In this case, the precoder determining unit 1330 calculates a precoder by using all channel information. That is, the precoder determining unit 1330 performs step S740 of FIG. 7 as described above. The precoding unit 1340 precodes a signal to be transmitted by using the precoder determined by the precoder determining unit 1330.

The resource allocation unit 1350 is allocated resources corresponding to the group set by the grouping unit. That is, the resource allocation unit 1350 allocates resources to each group such that all transmission and reception nodes of the same group are allocated the same resources and different groups are allocated different resources.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for precoding a signal at transmission nodes, the method comprising:
    receiving feedback on a first information as information regarding a transmission node that causes an interference-to-noise ratio (INR) greater than a first reference value from a plurality of reception nodes;
    determining a group to which each transmission node belongs on the basis of the first information;
    receiving feedback on channel information or precoder information from each reception node corresponding to the each transmission node;
    determining a precoder by using the channel information or the precoder information; and
    precoding a transmission signal by using the determined precoder.

2. The method of claim 1, wherein the determining of each group comprises:
    selecting a first transmission node from among transmission nodes whose group has not been determined; and
    determining remaining pairs of transmission and reception nodes, excluding second transmission nodes corresponding to the first information fed back from the first reception node corresponding to the first transmission node, second reception nodes corresponding to the second transmission nodes, and third reception nodes which provided feedback on the first information corresponding to the first transmission node, and transmission nodes corresponding to the third reception nodes, as a group which is the same as that of the first transmission node and the first reception node.

3. The method of claim 1, wherein the channel information is a first matrix obtained by applying an average to a matrix obtained by multiplying a channel coefficient matrix between each transmission node and each reception node and a conjugate transposed matrix of the channel coefficient matrix.

4. The method of claim 1, wherein the channel information is information obtained by quantizing a matrix obtained by applying an average to a matrix obtained by multiplying the channel coefficient matrix between each transmission node and each reception node and the conjugate transposed matrix of the channel coefficient matrix.

5. The method of claim 3, wherein the determining of a precoder comprises:
    selecting a number of eigenvectors that is half or less of the number of antennas of each transmission node, among eigenvectors of the first matrix; and
    determining a precoding matrix obtained by arranging the selected eigenvectors in the form of column vectors or row vectors.

6. The method of claim 1, wherein the precoder information is a precoding matrix obtained by arranging a number of eigenvectors that is half or less of the number of antennas of each transmission node, from among eigen vectors of a matrix obtained by applying an average to a matrix obtained by multiplying a channel coefficient matrix between the transmission node and reception node corresponding to the transmission node and a conjugate transposed matrix of the channel coefficient matrix, in the form of column vectors or row vectors.

7. The method of claim 1, wherein the transmission nodes that belong to the group are allocated the same radio resources, and the transmission nodes that belong to a group different from the group are allocated different radio resources.

8. A method for precoding a signal at transmission nodes, the method comprising:
    receiving feedback on a first information as information regarding a transmission node that transmits an interference signal causing an interference-to-noise ratio (INR) greater than a first reference value and smaller than a second reference value and a second information as information regarding a transmission node that transmits an interference signal causing an INR greater than the second reference value from a plurality of reception nodes;
    determining a group to which each transmission node belongs on the basis of the first information and the second information;
    allocating resources to each group such that all transmission and reception nodes of the same group are allocated the same resources and different groups are allocated different resources;
    determining a precoder according to the determined groups; and
    precoding a transmission signal by using the determined precoder.

9. The method of claim 8, wherein the determining of each group comprises:
    when a number of pairs of transmission and reception nodes whose groups are not determined is one, determining the pair of transmission and reception nodes, as a group;
    when a number of pairs of transmission and reception nodes whose groups are not determined is two or more, selecting a first transmission node from among the transmission nodes whose groups are not determined, and determining remaining pairs of transmission and reception nodes, excluding second transmission nodes corresponding to the first information and the second information, among information fed back by a first reception node corresponding to the first transmission node, and excluding third reception nodes which fed back information corresponding to the first transmission node as the first information or the second information, and third transmission nodes corresponding to the third reception nodes, as a preliminary group;
    when the preliminary group is not an empty set, determining pairs of transmission and reception nodes belonging to the preliminary group and the first transmission node and the first reception node, as a group; and
    when the preliminary group is an empty set, determining remaining pairs of transmission and reception nodes, excluding fourth transmission nodes corresponding to the second information fed back by the first reception node and fourth reception nodes corresponding to the fourth transmission nodes and excluding fifth reception nodes which fed back the information corresponding to the first transmission node, as the second information, and fifth transmission nodes corresponding to the fifth reception nodes, among the transmission and reception nodes whose groups are not determined, as a first preliminary group, and determining the transmission and reception nodes belonging to the first preliminary group and the first transmission node and the first reception node, as a group.

10. The method of claim 8, further comprising,
when an INR at reception nodes caused by each transmission node in a group is smaller than the first reference value or greater than the second reference value, each transmission node receiving feedback on channel information or precoder information from each reception node corresponding to each transmission node,
wherein in the determining of a precoder, a precoder is determined by using the channel information or the precoder information.

11. The method of claim 10, wherein the channel information is a first matrix obtained by applying an average to a matrix obtained by multiplying a channel coefficient matrix between each transmission node and each reception node corresponding to each transmission node and a conjugate transposed matrix of the channel coefficient matrix.

12. The method of claim 10, wherein the precoder information is a precoding matrix obtained by arranging eigenvectors, obtained by applying an average to a matrix obtained by multiplying a channel coefficient matrix between each transmission node and each reception node corresponding to each transmission node and a conjugate transposed matrix of the channel coefficient matrix, in sequence, starting from an eigenvector having the highest eigenvalue, selecting eigenvectors having a higher eigenvalue by half or less of the number of antennas of each transmission node.

13. The method of claim 8, further comprising,
when an INR caused by each transmission node at reception nodes in each group is greater than or equal to the first reference value or smaller than or equal to the second reference value, each transmission node receiving feedback on channel information between each reception node and all transmission nodes of the group from each reception node that belongs to the group,
wherein in the determining of a precoder, a precoder is calculated through an iterative process such that a predetermined reference value becomes equal to or lower than a predetermined value by using the feedback channel information, and a precoder at an immediately previous time is substituted for an initial input value of the iterative process.

14. The method of claim 13, wherein the predetermined reference value is a value of strength of a reception interference signal or a value obtained by linearly combining strength of a reception signal and strength of the reception interference signal.

15. A precoding apparatus comprising:
a feedback reception unit configured to receive feedback on a first information as information regarding a transmission node that transmits an interference signal causing an interference-to-noise ratio (INR) greater than a first reference value or a second information as information regarding a transmission node that transmits an interference signal causing an INR greater than or equal to the first reference value or smaller than or equal to a second reference value, and a third information as information regarding a transmission node that transmits an interference signal causing an INR greater than the second reference value;
a grouping unit configured to determine a group to which each transmission node belongs according to the first information or determining a group to which each transmission node belongs according to the second information and the third information;
a resource allocation unit configured to allocate resources according to the determined group;
a precoder determining unit configured to determine a precoder according to the determined group; and
a precoding unit configured to precode a transmission signal by using the determined precoder.

16. The apparatus of claim 15, wherein when the feedback reception unit receives the first information,
the feedback reception unit receives feedback on channel information or precoding information from each reception node corresponding to each transmission node, and
the precoder determining unit determines the precoder by using the channel information or the precoding information.

17. The apparatus of claim 16, wherein when the feedback reception unit receives the first information,
the grouping unit selects a first reception node which has not been grouped, and determines remaining pairs of transmission and reception nodes, excluding second transmission nodes corresponding to the first information fed back from the first reception node, second reception nodes corresponding to the second transmission nodes, third reception nodes which had fed back the first information corresponding to the first transmission node, and transmission nodes corresponding to the third reception nodes, as a group which is the same as that of the first transmission node and the first reception node.

18. The apparatus of claim 15, wherein when the feedback reception unit receives the second information and the third information,
if a number of pairs of transmission and reception nodes whose groups are not determined is one, the grouping unit determines the single pair of transmission and reception nodes, as a group,
if a number of pairs of transmission and reception nodes whose groups are not determined is two or more, the grouping unit selects a first transmission node from among the transmission nodes whose groups are not determined, determines remaining pairs of transmission and reception nodes, excluding second transmission nodes corresponding to the first information and the second information among information fed back by a first reception node corresponding to the first transmission node, and second reception nodes corresponding to the second transmission nodes, and excluding third reception nodes which had fed back information corresponding to the first transmission node, as the first information or the second information, and third transmission nodes corresponding to the third reception nodes, as a preliminary group; and
when the preliminary group is not an empty set, the grouping unit determines pairs of transmission and reception nodes that belong to the preliminary group and the first transmission node and the first reception node, as a group, and
when the preliminary group is an empty set, the grouping unit determines remaining pairs of transmission and reception nodes, excluding fourth transmission nodes corresponding to the second information fed back by the first reception node and fourth reception nodes corresponding to the fourth transmission nodes and excluding fifth reception nodes which had fed back information corresponding to the first transmission node, as the second information, and fifth transmission nodes corresponding to the fifth reception nodes, among the transmission and reception nodes whose groups are not determined, as a first preliminary group, and determines the transmission and reception nodes that belong to the first preliminary group and the first transmission node and the first reception node, as a group.

19. The apparatus of claim 15, wherein the resource allocation unit allocates resources to each group such that all transmission and reception nodes of the same group are allocated the same resources, and different groups are allocated different resources.

* * * * *